(12) United States Patent
Downing

(10) Patent No.: US 8,979,451 B2
(45) Date of Patent: Mar. 17, 2015

(54) SELF-LEVELING LIFT-ASSISTED DECKING SYSTEM FOR USE IN A CARGO TRAILER

(71) Applicant: Steven E. Downing, Plainfield, IN (US)

(72) Inventor: Steven E. Downing, Plainfield, IN (US)

(*) Notice: Subject to any disclaimer, the term of this patent is extended or adjusted under 35 U.S.C. 154(b) by 0 days.

(21) Appl. No.: 13/900,339

(22) Filed: May 22, 2013

(65) Prior Publication Data
US 2013/0315687 A1 Nov. 28, 2013

Related U.S. Application Data

(60) Provisional application No. 61/650,061, filed on May 22, 2012.

(51) Int. Cl.
*B60P 7/15* (2006.01)
*B61D 45/00* (2006.01)
(52) U.S. Cl.
CPC .......................................... *B60P 7/15* (2013.01)
USPC ........... 410/144; 410/143; 410/150; 410/151; 410/138; 410/137

(58) Field of Classification Search
USPC ......... 410/144, 143, 145, 146, 148, 150, 130, 410/129, 127
See application file for complete search history.

(56) References Cited

U.S. PATENT DOCUMENTS

| | | | | | |
|---|---|---|---|---|---|
| 2,978,993 | A | * | 4/1961 | Hall | 410/129 |
| 4,294,569 | A | * | 10/1981 | Lewis et al. | 410/133 |
| 4,494,896 | A | * | 1/1985 | DiFranco | 410/148 |
| 4,722,646 | A | * | 2/1988 | McIntyre | 410/138 |
| 5,104,269 | A | * | 4/1992 | Hardison | 410/149 |
| 5,785,475 | A | * | 7/1998 | Winstel et al. | 410/146 |
| 7,614,187 | B1 | * | 11/2009 | Forbes | 52/202 |
| 8,172,494 | B1 | * | 5/2012 | Knox | 410/89 |
| 8,388,287 | B2 | * | 3/2013 | Arnold et al. | 410/150 |

* cited by examiner

*Primary Examiner* — Glenn Dayoan
*Assistant Examiner* — Sunsurraye Westbrook
(74) *Attorney, Agent, or Firm* — Rader, Fishman & Grauer PLLC

(57) ABSTRACT

An improved captive beam decking system is disclosed for use in a cargo trailer. The system includes a beam assembly and a foot assembly that is selectively engagable to a vertical sliding track system. The sliding track system is attached to the sidewall of a trailer vertically. The beam can be easily moved at different heights that are selected based upon the configuration of the cargo trailer.

21 Claims, 9 Drawing Sheets

SELF-LEVELING LIFT-ASSISTED DECKING SYSTEM FOR USE IN A CARGO TRAILER

CROSS-REFERENCE TO RELATED APPLICATIONS

This Application claims the benefit of U.S. Provisional Application 61/650,061 filed on May 22, 2012.

FIELD OF THE INVENTION

This application relates to storage systems for use in cargo trailers, and in particular, to an improved system for controlling the decking system in a cargo trailer.

BACKGROUND OF THE TECHNOLOGY

Transporting cargo in the United States is an important component of the economy. Current methods of transporting cargo across the interior of the United States includes the use of railroads where shipping containers can be loaded on to railway cars and shipped from a distribution center to a drop point. Other forms of transporting cargo across the interior of the United States include using a semi-trailer as a cargo hauler which is in turn pulled by a tractor. Cargo is placed within the cargo hauler and can be secured to the side walls or floors of the interior of the cargo hauler in order to secure the cargo in place during transit. Cross-beams can be secured to the side walls and may aid in securing cargo within the cargo hauler.

Traditionally it has been difficult to control the placement of support structures, such as cross-beams, within the cargo hauler. A cross-beam can be placed laterally across the interior of the cargo trailer in order to support cargo that may be stacked thereon. By stacking the cargo vertically within the hauler, all of the space within the hauler can be more efficiently used. Such increased efficiency allows the cargo hauler owner to move freight more efficiently and increase revenue opportunities.

In order to stack cargo vertically to the ceiling within the cargo hauler it is sometimes desirable to separate the cargo into different skews. One method of separating the cargo in to different skews is to position cross-beams laterally across the wall of the trailer. Once the cross-beams are secured, cargo can then be placed on top of the cross-beam. A plurality of cross-beams may be stacked vertically within the trailer to separate the cargo into different layers. Moving the cross-beam up and down to selected positions requires two workers to work in concert so as to evenly position the cross-beam at a desired vertical height. This task can be very time consuming and costly.

It would be desirable to a provide a cargo trailer deck system that is operable to release the cross-beam from its current position and move it to a preferred height while keeping the beam level in one fluid motion. It would also be desirable to provide an improve cargo trailer deck system that can be easily operated by a single worker instead of two workers.

BRIEF DESCRIPTION OF THE DRAWINGS

The exemplary illustrations described herein are not intended to be exhaustive or otherwise limiting or restricted to the precise form and configuration shown in the drawings and disclosed in the following detailed description.

DETAILED DESCRIPTION

An improved captive beam decking system is disclosed for use in a cargo trailer. The system reduces the steps involved to move a beam to a desired height through a mechanical system that can be manipulated by one operator.

The captive decking system includes a beam that spans the length of an enclosed cargo trailer and is attached to a vertical sliding track system. The sliding track system is attached vertically to the sidewall of a trailer. One or more beams span between the tracks and may directly support cargo or accommodate spanning panels upon which the cargo can be placed. The tracks permit a releasable connection of each beam at different heights that are selected based upon the configuration of the cargo.

To adjust the beam height for any captive beam a foot assembly is located on each end of the beam. The foot assembly contains a stop mechanism to engage the track. The beam is moved evenly in a vertical direction and can be done so by a single operator standing on either side of the beam while applying a vertical force. After the desired height is obtained, the foot assembly automatically engages the track. The assembly adjusts in an unlimited number of positions while using limited force by a user. To complete the deck a spanning panel can be placed across the beams to create a level platform to load freight.

Figure 1:
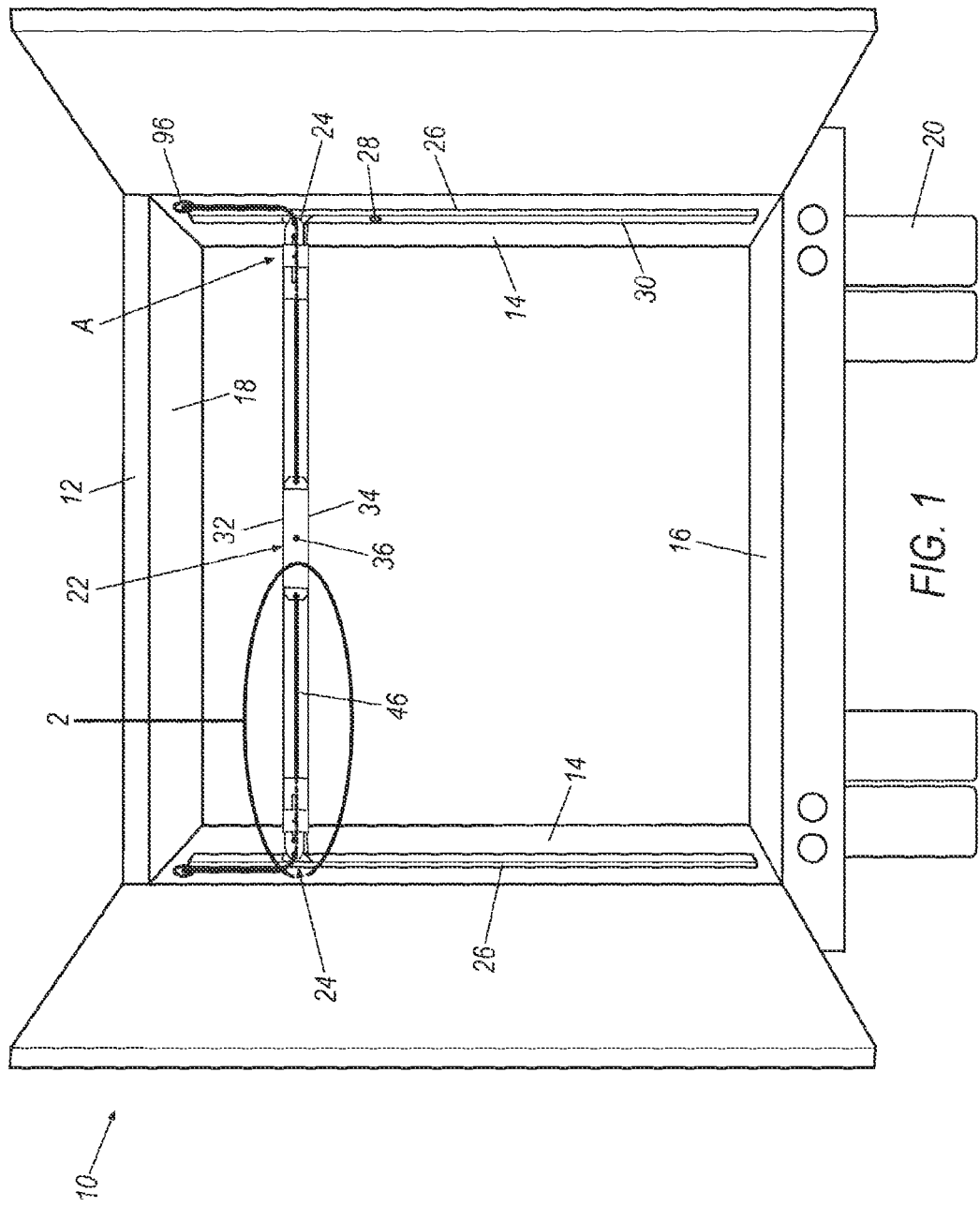
FIG. 1 is an end view of self-leveling lift-assisted deck system shown in relation to a cargo trailer.

With reference to FIG. 1, a captive decking system 10 is disclosed positioned within a cargo trailer 12. The cargo trailer 12 is of standard construction and includes side walls 14, a floor 16, and ceiling 18. The cargo trailer 12 may be portable and have wheels 20 or could be placed on a railway car for transporting to a destination point.

The captive decking system 10 includes a beam assembly 22, a foot assembly 24, and a track 26. The decking system 10 is made of durable rigid material such as steel and is operable to carry heavy loads. The track 26 can be made of rigid steel and is elongated and is secured to the wall 14 by fasteners. The track 26 has openings 28 for receiving a stop member and a slot 30 extending substantially the entire length of the track 26. A plurality of tracks 26 may be positioned fore and aft in the cargo trailer 12.

The beam assembly 22 includes an elongated beam 32, a beam lift stabilizer assembly 34, and a securing member 36 for connecting the beam lift stabilizer assembly 34 to the beam 32. The beam lift stabilizer assembly 34 is a device that guides and operates the cables that permit the beam assembly 22 to traverse vertically up and down in the cargo trailer 12.

Figure 2:
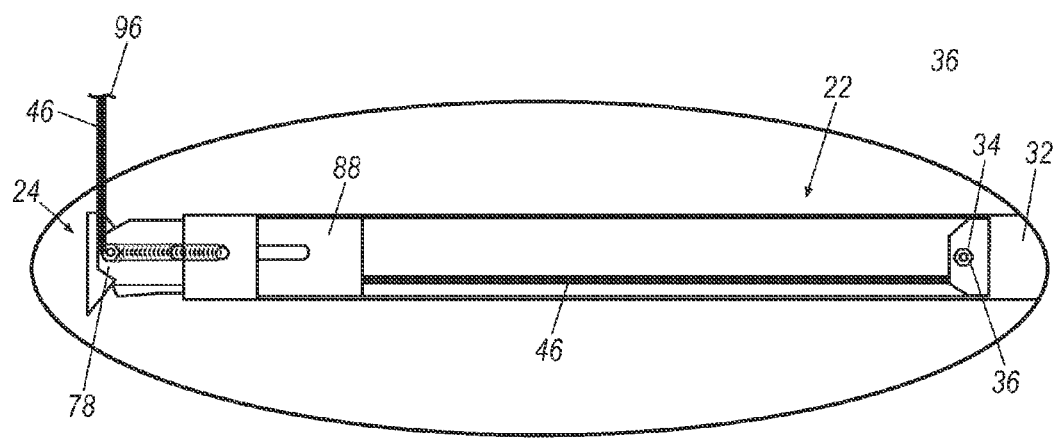
FIG. 2 is an enlarged view taken from circle 2 of FIG. 1, showing one side of the self-leveling lift-assisted deck system.

FIG. 2 depicts an enlarged view of the left side of the beam assembly 22 as shown in FIG. 1. A portion of the wall of the beam 32 is shown broken away for illustrative purposes only. Here the beam assembly 22 shows the cable 46 connected to the beam lift stabilizer assembly 34, extending through a beam channel 88, routed around the pulley sheave 78, and anchored to the wall 14 or some other location where the opposing end of the cable 46 is rigidly fixed thereto at point 96. As the cable 46 is wound and unwound around the pulley housing 38, tension is applied to anchor 96, thus providing for the smooth upward and downward positioning of the beam assembly 22.

Figure 3:
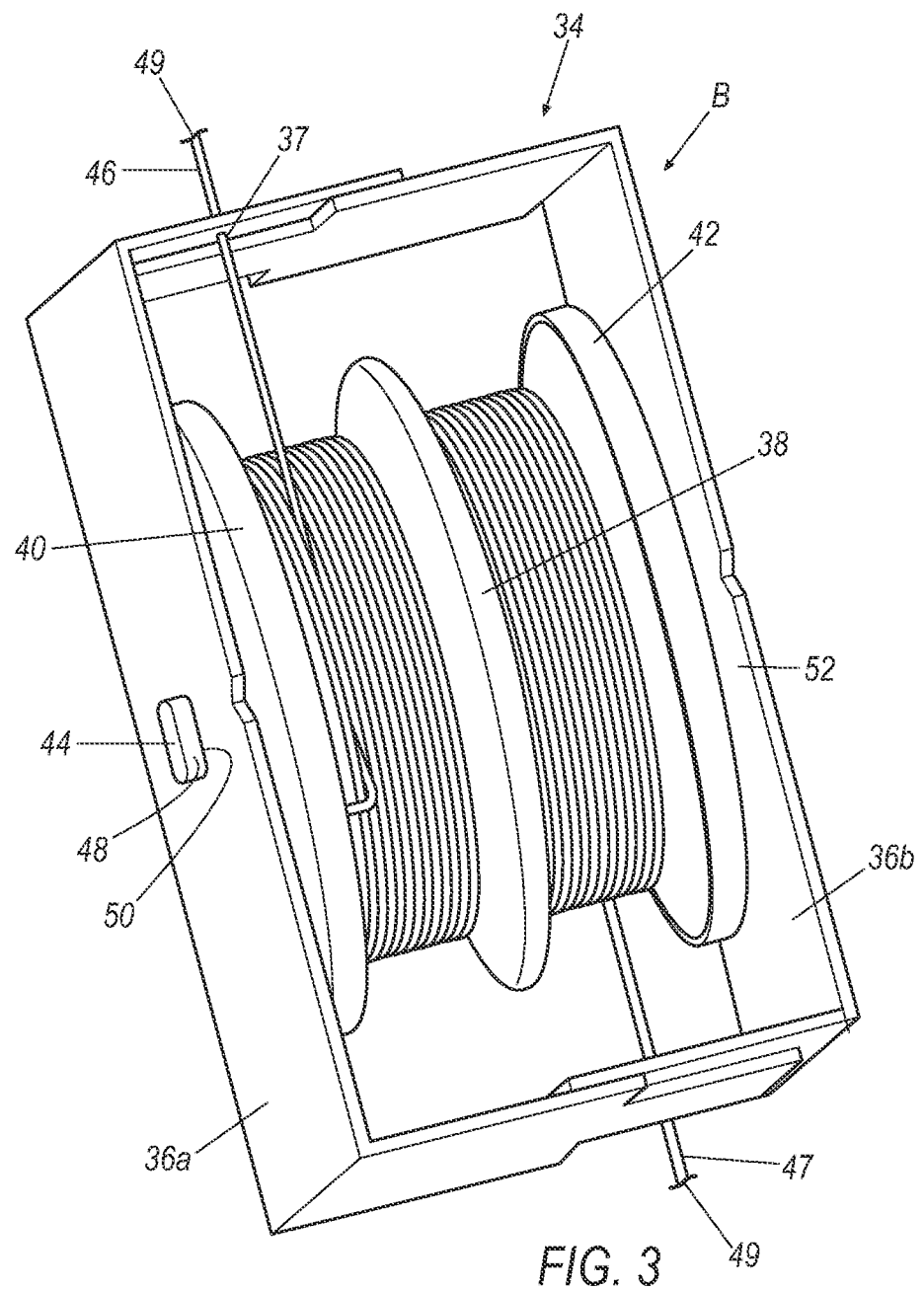
FIG. 3 is a perspective view of the lift stabilizer assembly.

FIG. 3 illustrates the stabilizer assembly 34 which is constructed of metal and includes a two piece casing 36a and 36b, a spring housing 38, a first end cap 40, a second end cap 42, a shaft 44, and a pair of cables 46 and 47 that are wound around the spring housing 38. It will be appreciated that the casing 36 could be a unitary piece. However, in the embodiment shown, the two piece casing 36A and 36B are slideably connected to one another at their outer ends. Each cable 46 and 47 has a stop 49 which engages the casing 36a and 36b so as to control movement of the cables. Holes 37 are provide in each casing 36a and 36b for guiding the cables as they traverse relative to the spool 38.

The shaft 44 has a rectangular, or other geometric configuration, end portion 48 that engages a slot 50 in a wall of the casing 36. The shaft 44 extends through a center bore of the spring housing 38 and rests in a corresponding hole 50 in the opposing wall 52. Thus, the spring housing 38 rotates relative to the stationary shaft 44.

Figure 4:
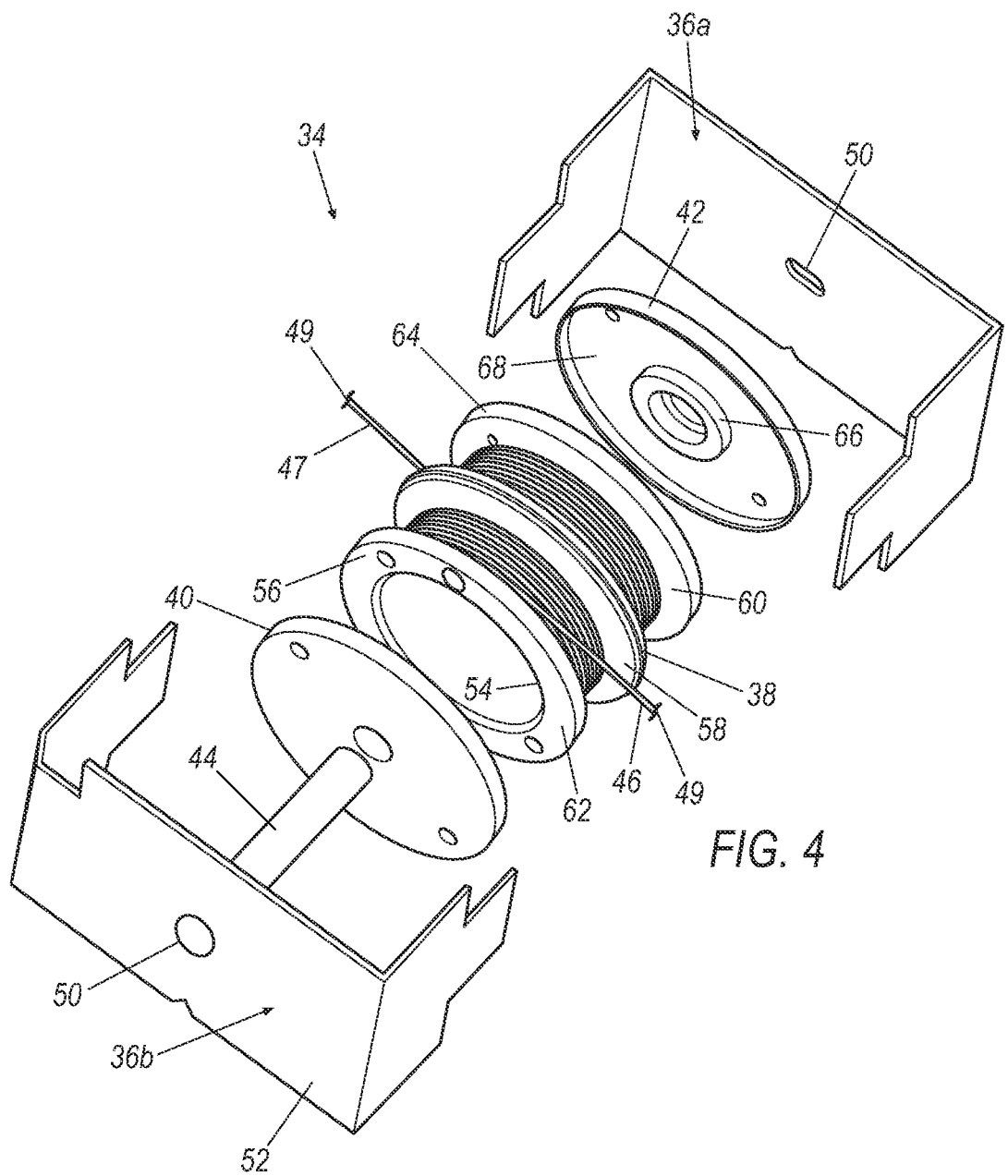
FIG. 4 is an exploded view of the components of the lift stabilizer assembly.

With reference to FIG. 4, the components of the beam lift stabilizer assembly 34 are shown in an exploded view. The spring housing 38 is tubular shaped and has a diameter 54, a side wall 56, a middle radially extending wall 58, and another side wall 60. The middle wall 58 creates a separation between cables 46 and 47, which in turn are connected to anchors 96 that are at or near the top of the tracks 26. The cables 46 and 47 are wound around the diameter 54 or spool of the spring housing 38 and they extend in opposite directions. The cables are preferably made of heavy gauge wire, and can be made from other materials such as high strength synthetic rope.

The end cap 40 is secured to a face 62 of side wall 56 by conventional fasteners. Likewise, the end cap 42 is secured to a face 64 to side wall 60 by fasteners. An end cap bearing 66 is positioned on or near an inside surface 68 and operates as a guide for one end of the shaft 44. The bearing 66 may be located near or on both caps 40 and 42 so as to assist in axial rotation of the shaft 44.

Figure 5:
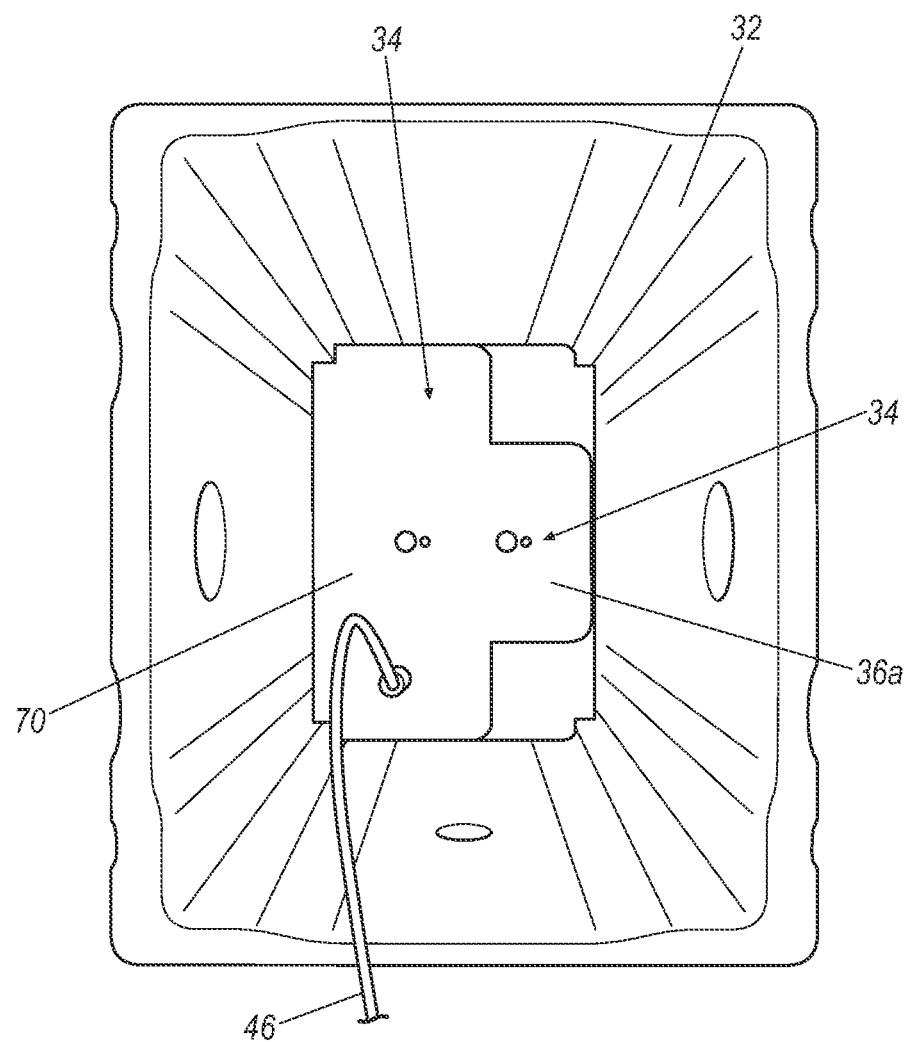
FIG. 5 is end view looking at the inside of the beam with the lift stabilizer assembly positioned therein.

FIG. 5 depicts a view looking in to the beam 32, with the beam stabilizer assembly 34 disposed within the beam 32. The assembly 34 is fastened via bolt 36 (see FIG. 1) to the beam 32 so as to keep the assembly 34 from moving within the inside of the beam 32. A cable 46 is shown extending out a wall 70 of the casing 36a.

Figure 6:
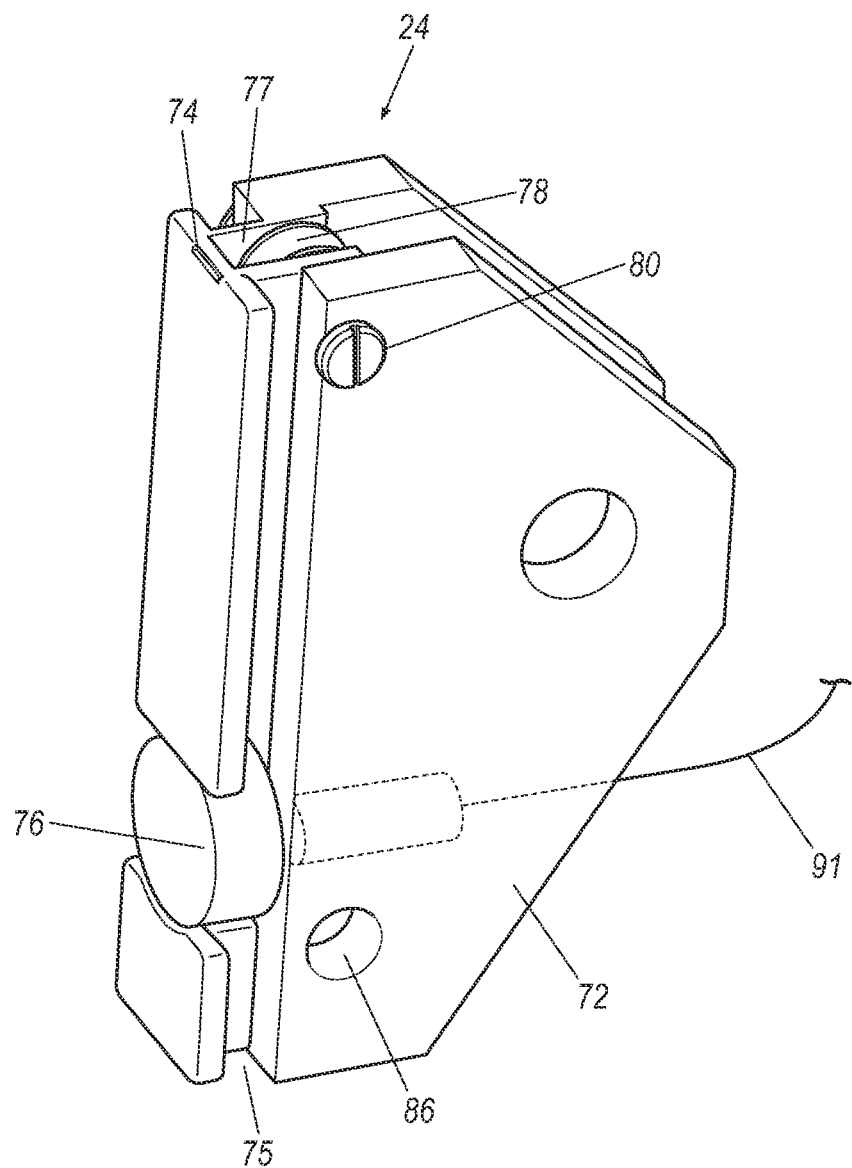
FIG. 6 is a perspective side view of the a sliding foot assembly.
Figure 7:
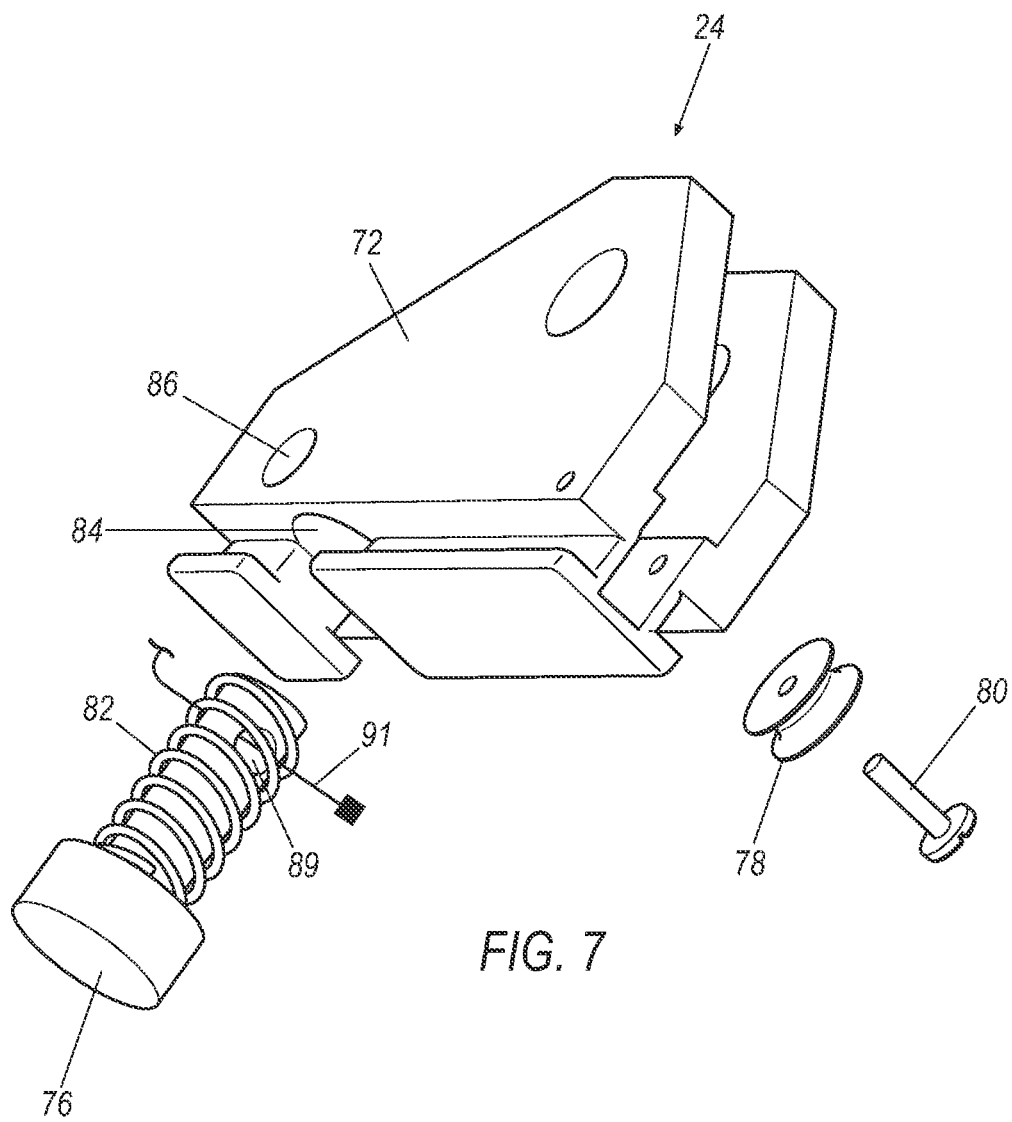
FIG. 7 is an exploded view of the sliding foot assembly.

FIGS. 6 and 7 illustrate a sliding foot assembly 24 that is depicted in the assembly of FIG. 1. The sliding foot assembly 24 is preferably made of durable rigid material such as, but not limited to metal. The foot assembly 24 has a body 72, a T-shaped member 74 with a channel 75, a stop or plunger 76, a cable redirect sheave 78, a sheave pin 80 for securing the sheave 78 to the body 72, and a spring 82 for biasing the stop 76. The T-shaped member 74 extends a substantial length of the body 72 and is operable to engage a slot 30 that is part of the track 26. This arrangement creates a sliding fit between the track 26 and the foot assembly 24. The sheave 78 is received within a channel 77 of the member 74.

The stop 76 operates like a plunger by moving axially within a bore 84 of the body 72. A hole 89 extend through an elongated portion of the stop 76 and receives a cable 91 that has a stop on the end thereof. The cable 91 extends through the body 72 of the foot assembly 24 and can be manipulated by an operator by various means such as applying tension of the cable 91. By applying tension, the stop 76 can disengage the track 26. The spring 82 biases the stop 76 in an outward direction so as to bias the stop toward the track 26 and into holes or notches 28 that are formed within the track 26. The stop is tubular shaped and is operable to automatically engage the notches 28 once an operator moves the beam assembly 22 to a desired position. The cables 46 and 47 are guided around their respective redirect sheaves 78 that are in turn rotatably connected to a pin 80 which is in turn anchored in the bore 86.

Figure 8:
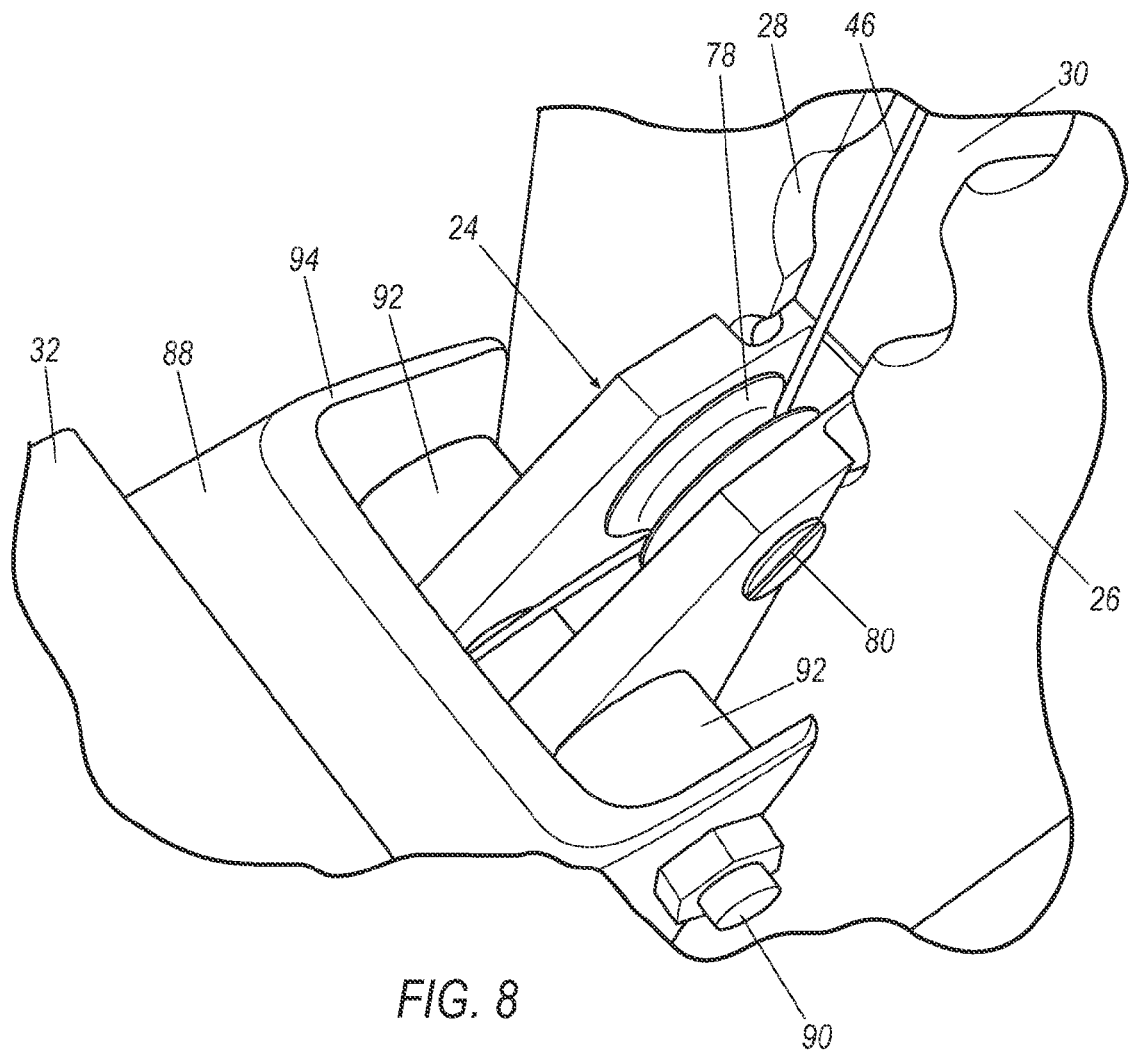
FIG. 8 is a partial perspective view, taken from the direction of arrow A of FIG. 1, showing the foot assembly positioned within the vertical track.

FIG. 8 illustrates a perspective view of the foot assembly 24 mounted to a beam channel 88 which is in turn slideably positioned within the beam 32. A bolt 90 extends through a side wall of the beam channel 88, a spacer 92, the foot assembly 24, another spacer 92, and the opposing side wall 94 of the beam channel 88. The cable 46 extends from the assembly 34, loops around the sheave 78 and is directed to an anchor 96 on or near the wall 14 of the cargo trailer 12. The beam channel 88 is an elongated steel member that houses the foot assembly 24 and is operable to slide axially relative to the beam 32 to permit adjustment of the assembly 22 as wall 14 fluctuations may occur.

The vertical tracks 26 have a slot 30 that allows the foot assembly 24 to slide within the track. The stop 76 has a rounded end portion that can move within the holes 28 of the slot 30 so as to provide a locking engagement between the beam 32 and the track 26. The spring 82 biased the stop 76 into the holes 28 so as to maintain locking engagement between the members while in a static mode. A release or lever L may be provided so as to disengage the stop 76 from the track 26.

Figure 9:
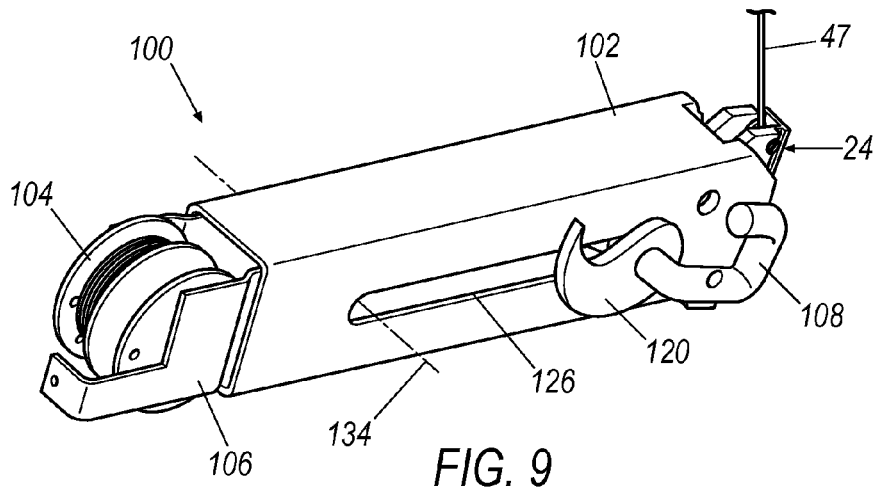
FIG. 9 is an alternative embodiment self-leveling lift-assisted deck system for use in a cargo trailer.
Figure 10:
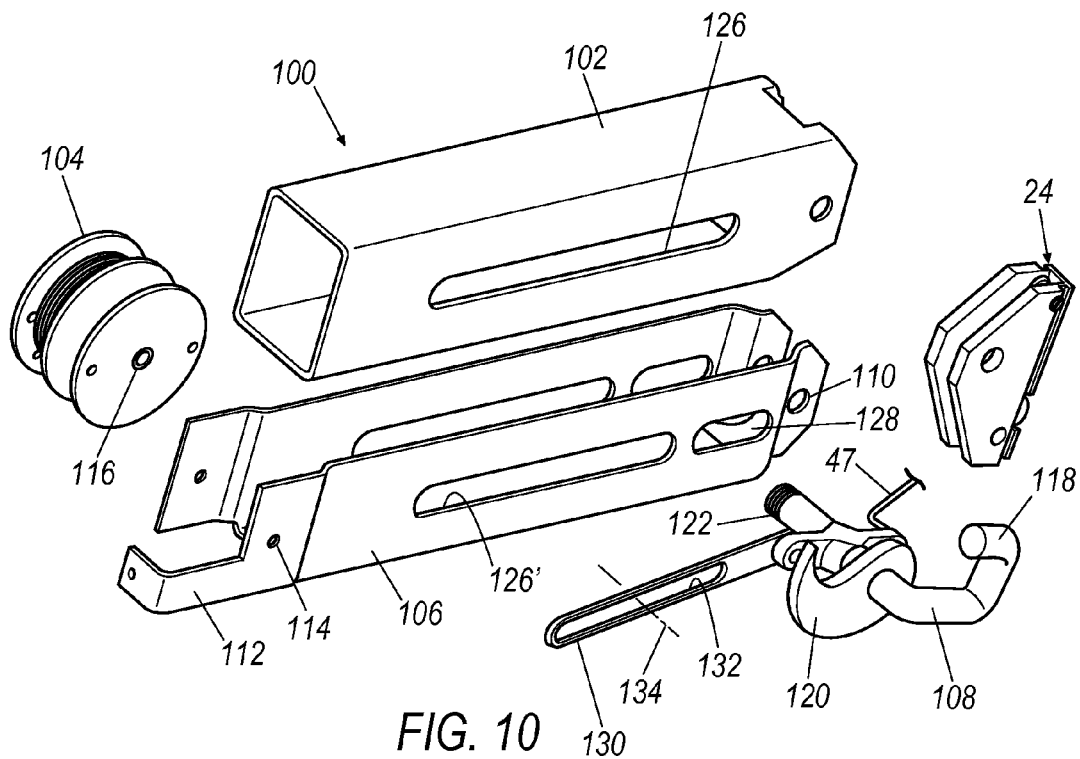
FIG. 10 is an exploded view of the FIG. 9 device, showing its individual members.

FIG. 9 illustrates an alternative captive decking system 100 that can be used in place of the system discussed above. The system 100 includes a beam channel 102, a pulley housing 104 which similar to the housing 38 of FIG. 3, an inner bracket 106 that fits within the beam 103, and a lever assembly 108. A foot assembly 24 is mounted to the bracket 106 via a fastener (not shown) that extends through hole 110. The foot assembly is operable to pivot relative to the bracket 106 which in turn the bracket 106 moves axially relative to the beam 102. The beam channel 102 is positioned within a beam (see FIG. 1). A slot 126 extends axially a portion of the beam channel 102.

The bracket 106 includes a mounting portion 112 and the pulley housing 104 pivotally mounts via holes 114 and a pin (not shown) to the bore 116 of the pulley housing 104. The lever 108 has a handle 118 and a latch 120 that when pressed by an operator, allows the handle to rotate and impart motion to cable 47 which in turn is connected to the stop or plunger 75 of the foot assembly 24. This action allows an operator to disengage the foot assembly 24 from the track 26 so as to allow the system 100 to move within the cargo hauler. The lever has a shaft 122 that extends through the bracket 106 and is connected via a fastener so as to rotatably secure the lever 108 to the bracket 106. A slot 126 is provided within the beam 102 and allows the shaft 122 of the handle 108 to slide so as to provide axial movement of the beam 102 and bracket 106.

A slot 126' is provided in the side wall of the bracket 126 along with a smaller slot 128 that is operable to receive the shaft 122 of the handle 108. A release shaft 130 extends from the shaft 122 and has a slot 132. Once assembled, a bolt 134 extends through the slot 132, slot 126' and slot 126 and the bolt is tightened against the beam channel 102. In operation, the operator may push against the beam 34 thus causing the latch 120 to impinge upon an inside surface of the beam 34 so as to cause rotational movement of the shaft 122. When this occurs, the cable 47 is pulled causing the plunger 76 to disengage the track. When the operator takes pressure off of the beam 34, the plunger reengages, thus causing the foot assembly to lock in place.

A method of operating the system 10 or 110 will be further presented. First, the operator releases the beam 22 from the sidewall 14 so that it can move vertically either up or down to the correct position. This takes place at the foot assembly 24 by releasing the plunger or stop 76 on each side. Once the beam is released it can be moved.

Starting at the top position the operator starts to pull the beam 22 down; this action of pulling the beam down pulls on the transfer cables 46, 47 which extend from a fixed location at the top of the track 26 down through the track and to the center of the beam where it attaches to the beam lift stabilizer 34.

The beam lift stabilizer 34 has pre-wound cable and is attached to the inside of the beam at the center via fastener 36. The action of the power transfer cable pulling on the beam lift stabilizer unwinds cable in two directions at once and creates a centrifugal force that winds the lift assist spring creating tension. As the power transfer cable is unwound tension is applied to the lift assist spring, this tension is what assists in lifting the beam.

This process takes place on one side of the beam from the pulley spool and is reflected on the other side automatically which keeps the beam level as it is raised and lowered.

The device 100 operates in a similar manner however a handle 108 is provided which allows an operated to remotely control and disengage the foot assembly 24 from the track 26 so as to allow movement therebetween. Releasing the lever 108 allows the spring loaded stop 76 of the foot assembly 24 to re-engage the track at openings 28.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims.

What is claimed is:

1. A self-leveling lift-assisted decking system for use in a cargo container, the cargo container having walls and a floor, the decking system comprising:
   a beam assembly positioned within a cargo container;
   a foot assembly, the foot assembly is slideably positioned relative to the beam assembly;
   a release assembly for releasing the foot assembly from engaging another structure; and
   a spool assembly,
   wherein the system is operable to adjust vertically evenly.

2. The decking system as claimed in claim 1, further comprising a track that is fixed to at least one wall of the cargo container, the track has openings that the foot assembly may engage.

3. The decking system as claimed in claim 1, further comprising a lift stabilizer assembly which is positionable within the beam assembly.

4. The decking system as claimed in claim 1, further comprising a locking mechanism at each foot assembly, the locking mechanism is operable to engage a track.

5. The decking system as claimed in claim 1, further comprising a spring loaded foot assembly to push the foot assembly against the sidewall while in transit.

6. The decking system as claimed in claim 1, further comprising a first track and a second track, the tracks are mounted on vertical walls of the cargo container.

7. The decking system as claimed in claim 1, wherein the foot assembly includes a base, a slotted portion, a plunger, and a cable redirect sheave.

8. The decking system as claimed in claim 1, wherein the foot assembly includes a T-Shaped portion for engaging a slot in a track.

9. The decking system as claimed in claim 1, further comprising a beam channel that has a mounting feature for supporting the foot assembly.

10. The decking system as claimed in claim 1, wherein the foot assembly includes a spring biased engagement feature for holding the foot assembly in place relative to a cargo container wall or floor.

11. A kit for a decking system for use in a cargo container, the kit is operable to be used with a beam, the kit comprising:
    a foot assembly that is operable to engage a track in the cargo container, the foot assembly is operable to selectively engage the track to permit the decking system to be locked in place;
    a release assembly that is operable to release the foot assembly from the track in response to an axial force relative to the beam;
    a beam lift mechanism that is operable to be received within the beam; and
    a cable connecting the foot assembly to the beam lift mechanism,
    wherein the system is operable to adjust vertically evenly.

12. The kit as claimed in claim 11, further comprising a release that allows the cable to disengage the foot assembly from a track within the cargo container.

13. The kit as claimed in claim 11, further comprising at least on track that can be secured to a wall of the cargo container.

14. The kit as claimed in claim 11, further comprising a beam, the beam is operable to receive the beam lift mechanism.

15. A self-leveling decking system to release a deck from its current position and move it to a preferred height, comprising:
    a beam;
    a foot assembly;
    a spool assembly;
    a cable assembly; and
    a track, wherein the system is operable to adjust vertically evenly.

16. The self-leveling decking system as claimed in claim 15, wherein the foot assembly includes a plunger that is spring biased, the plunger has an end portion that engages an opening in the track.

17. The self-leveling decking system as claimed in claim 15, wherein the spool assembly includes a casing and a spring assembly.

18. The self-leveling decking system as claimed in claim 15, wherein cable assembly includes a first cable wrapped around a first portion of the spool assembly, and a second cable wrapped around a second portion of the spool assembly.

19. The self-leveling decking system as claimed in claim 15, wherein the spool assembly includes a release for disengaging the foot assembly from the track.

20. The self-leveling decking system as claimed in claim 15, wherein cable assembly includes at least one cable that connects the spool assembly to a fixed point near the track.

21. A method for operating a self-leveling decking system having a beam and a foot assembly, the method comprising:
- releasing the foot assembly from a current height relative to a track, wherein the foot assembly is operable to be released in response to a force relative to at least one of the beam, a handle, and a pull cord;
- evenly adjusting the system in a vertical direction along the track to a preferred height; and
- engaging the foot assembly with the track at the preferred height.

* * * * *